(12) United States Patent
Holway et al.

(10) Patent No.: US 8,016,494 B2
(45) Date of Patent: Sep. 13, 2011

(54) FOLDING CAMERA SUPPORT WITH ROTATIONAL INERTIA ADJUSTMENT

(75) Inventors: Jerry Holway, Exton, PA (US); Garrett W. Brown, Philadelphia, PA (US); H. Robert Orf, Simi Valley, CA (US)

(73) Assignee: Garrett W. Brown, Philadelphia, PA (US)

( * ) Notice: Subject to any disclaimer, the term of this patent is extended or adjusted under 35 U.S.C. 154(b) by 0 days.

(21) Appl. No.: 12/762,800

(22) Filed: Apr. 19, 2010

(65) Prior Publication Data

US 2010/0266272 A1 Oct. 21, 2010

Related U.S. Application Data

(60) Provisional application No. 61/170,860, filed on Apr. 20, 2009.

(51) Int. Cl.
*G03B 17/00* (2006.01)
(52) U.S. Cl. ........................................ 396/428
(58) Field of Classification Search ............ 396/428
See application file for complete search history.

(56) References Cited

U.S. PATENT DOCUMENTS

| | | |
|---|---|---|
| 4,368,997 A | 1/1983 | Shemtov |
| 4,474,439 A | 10/1984 | Brown |
| RE32,213 E | 7/1986 | Brown |
| 4,946,272 A | 8/1990 | Brown |
| 5,098,182 A | 3/1992 | Brown |
| D329,449 S | 9/1992 | Brown et al. |
| 5,229,798 A | 7/1993 | Brown |
| D358,832 S | 5/1995 | Lenney et al. |
| 5,579,071 A | 11/1996 | Wetzel et al. |
| 5,752,112 A | 5/1998 | Paddock et al. |
| 6,293,676 B1 | 9/2001 | Holway |
| 6,752,541 B1 * | 6/2004 | Dykyj .......................... 396/428 |
| 7,390,131 B2 * | 6/2008 | Schaller ....................... 396/421 |
| 7,625,090 B2 | 12/2009 | Brown |
| 7,654,755 B2 | 2/2010 | Orf et al. |
| 2006/0231700 A1 | 10/2006 | Orf et al. |

FOREIGN PATENT DOCUMENTS

WO 9825038 A2 6/1998

OTHER PUBLICATIONS

International Search Report for PCT/US2010/031622 mailed on Jun. 28, 2010.
Written Opinion for PCT/US2010/031622 mailed on Jun. 28, 2010.

* cited by examiner

*Primary Examiner* — Rodney Fuller
(74) *Attorney, Agent, or Firm* — Schnader Harrison Segal & Lewis LLP

(57) ABSTRACT

A folding, adjustable camera support having a central post secured in one or more central post holders. A first camera equipment support component having a distal end and a proximate end is adjustably attached at its proximate end to one of the one or more central post holders, and is configured to adjust between an operative position and a folded position via an adjustment mechanism. The distance of the camera equipment is adjustable radially from the central post. A second camera equipment support component is similarly configured and adjustable with respect to the central post, and can balance the first camera equipment component.

12 Claims, 15 Drawing Sheets

FOLDING CAMERA SUPPORT WITH ROTATIONAL INERTIA ADJUSTMENT

BACKGROUND OF THE INVENTION

Operating modern video cameras may no longer require multi-person camera crews and therefore camera operators now often work solo and need to move quickly, with minimal assistance, from one location to the next. Often this requires expeditiously packing the camera and equipment into handbags and backpacks that can be carried by one person and readily unpacking and setting up at the new location. The ability to remove the camera and fold the stabilizer equipment in order to reduce the space required for storage and transport is therefore increasingly desirable. 'Compacting' camera stabilizing equipment, such as a Steadicam®-type stabilizer, as much as possible allows users of the system to transport the device conveniently and potentially at a lower cost, and to fit it readily into compact spaces such as in cars trunks and overhead airplane luggage compartments.

Modern Steadicam® stabilizers now typically provide adjustable spacing between the onboard monitor and batteries, which counterbalance one another in order to achieve static and dynamic balance. This also can augment or reduce the rotational inertia of the camera support platform about its central upright axis without affecting vertical balance. This inertial adjustment is preferably accomplished by slideably extending and retracting the forward monitor position vs. the rearward battery position. Given the fact that Steadicam®-type camera stabilizers increase rotational inertia to dampen unwanted rotations, it can be seen that slow, precise camera movements are facilitated by adjusting the position of the counterbalancing masses to provide increased rotational inertia in all three rotational axes—commonly designated 'pan' (rotation about the vertical axis), 'tilt' (rotation about an axis parallel to the axis of the camera lens), and 'roll' (rotation about an axis roughly perpendicular to the camera lens axis). Rapid 'panning' requires the opposite condition—i.e. minimum rotational inertia to reduce the effort of initiating and stopping these rotations.

Given further that rotational inertia for these stabilizer devices increases by the square of the distance between the counterbalancing masses, adjusting for maximum inertia typically involves sliding the monitor as far forward as practical (consistent with the operator's acceptable sightline for viewing), and sliding the remaining masses, typically including the batteries, rearward as far as practical. This can be accomplished by mounting these masses to the opposite ends of one or more appropriately oriented support rods that can be adjustably slid for-and-aft, in perpendicular relationship to the central vertical post structure of the camera support, and then rigidly clamped thereto.

Problems occur when the need arises to fold or otherwise compact these camera stabilizer devices, because monitor, batteries and associated support structures, extend from the device, even when fully retracted.

Accordingly, a need exists for a folding means that permits the support rods to be selectively clamped in either the operative orientation or a folding (storage) orientation, preferably quickly and conveniently, without the use of tools, and that reduces the size of the equipment to its minimum practical 'envelope' for storage and transport.

SUMMARY OF THE INVENTION

Exemplary embodiments of the invention provide adjustable inertial positioning and folding of counterbalancing masses by clamping and unclamping their respective support rods to allow them to be orientated from an attitude perpendicular to the central post to a parallel attitude.

Illustrative embodiments of the invention provide both 'operative' and 'storage' orienting components that accept and orient the support rod or rods in an operative position or in a folding and storage position, and secure the support rods in place.

Illustrative embodiments of the invention may also provide securing components that selectively immobilize, such as by clamping, the rod or rods at the desired degree of extension or retraction from the central post to augment or diminish the rotational moment of inertia, or to optimally position the folded components.

Illustrative embodiments may also provide a securing device that can be loosened, and that rotates around the axis of the clamping screw mechanism, in axial association with the support rod, as it is released from the horizontal orienting features and rotates 90° to be clamped against vertical orienting features.

Illustrative embodiments may also provide internal clamping means consisting of paired support rods with longitudinal slits and interior 'clamp nuts' captured by threaded turnbuckle means penetrating the slotted openings, so that the rods can be drawn inwardly against their corresponding orienting features (either in the 'operative' position or the 'storage' position) in order to immobilize the selected momentary tube extension in one or the other of those discrete attitudes.

Illustrative embodiments of the invention may also provide additional support rod stabilizing features, including annular cylindrical tube sections and the like that closely engage the support rod outer diameters in order to increase the rigidity and accuracy of the mounting orientation, particularly in the 'operative,' typically horizontal direction.

Illustrative embodiments of the invention may further provide bevels or other reductions to the cross-sectional profile of the internal clamping nuts that permit 'dead band' between the clamped and released positions for engaging or passing over the 'orienting features that register, respectively, the operating and the storage (folded) positions, without the necessity to separately re-adjust the clamp engagement for each step.

DETAILED DESCRIPTION OF THE DRAWINGS

Embodiments of the invention may be applicable for use with Steadicam® equipment or similar camera stabilizer devices, and therefore, will be described, at least in part, as they relate to such equipment. The invention, however, is not limited to use with only Steadicam® equipment.

Figure 1:
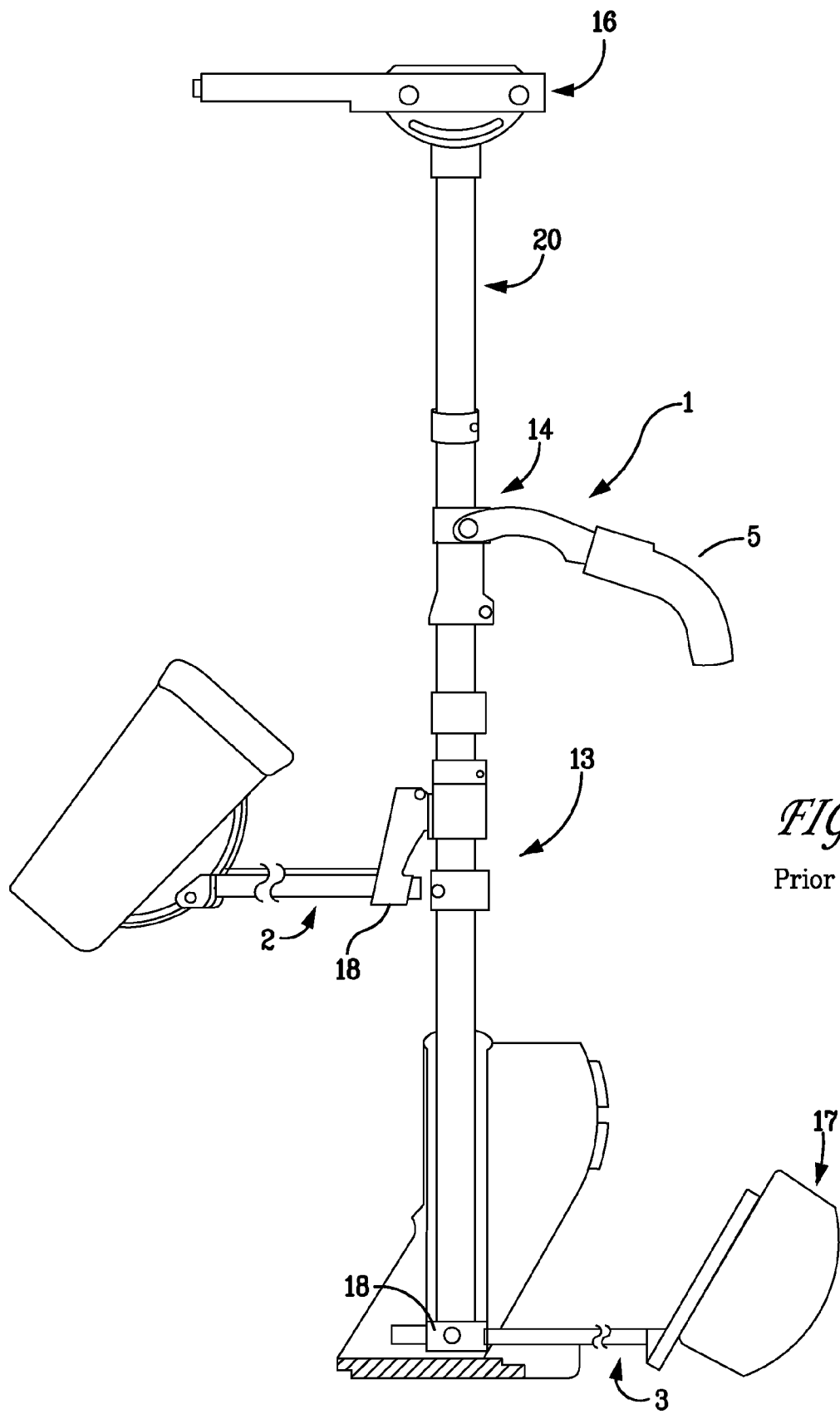
FIG. 1 is a prior art camera stabilizing device.

FIG. 1 is a side view of a camera stabilizer 1 of the prior art, such as a Steadicam® 9. A sled 13 supports a camera on camera mounting stage 16. Sled 13 has non-folding support rods 2 and 3, which support monitor 15 and batteries 17, respectively. Monitor 15 and batteries 17 serve as counterbalancing masses and can be adjusted perpendicularly from central post 20. A preferably equipoising parallelogram support arm 10, such as shown in FIG. 2, is attached to the stabilizer assembly 1, and further to an operator's vest 12 to facilitate the operator's carrying and use of the assembly.

Figure 2:
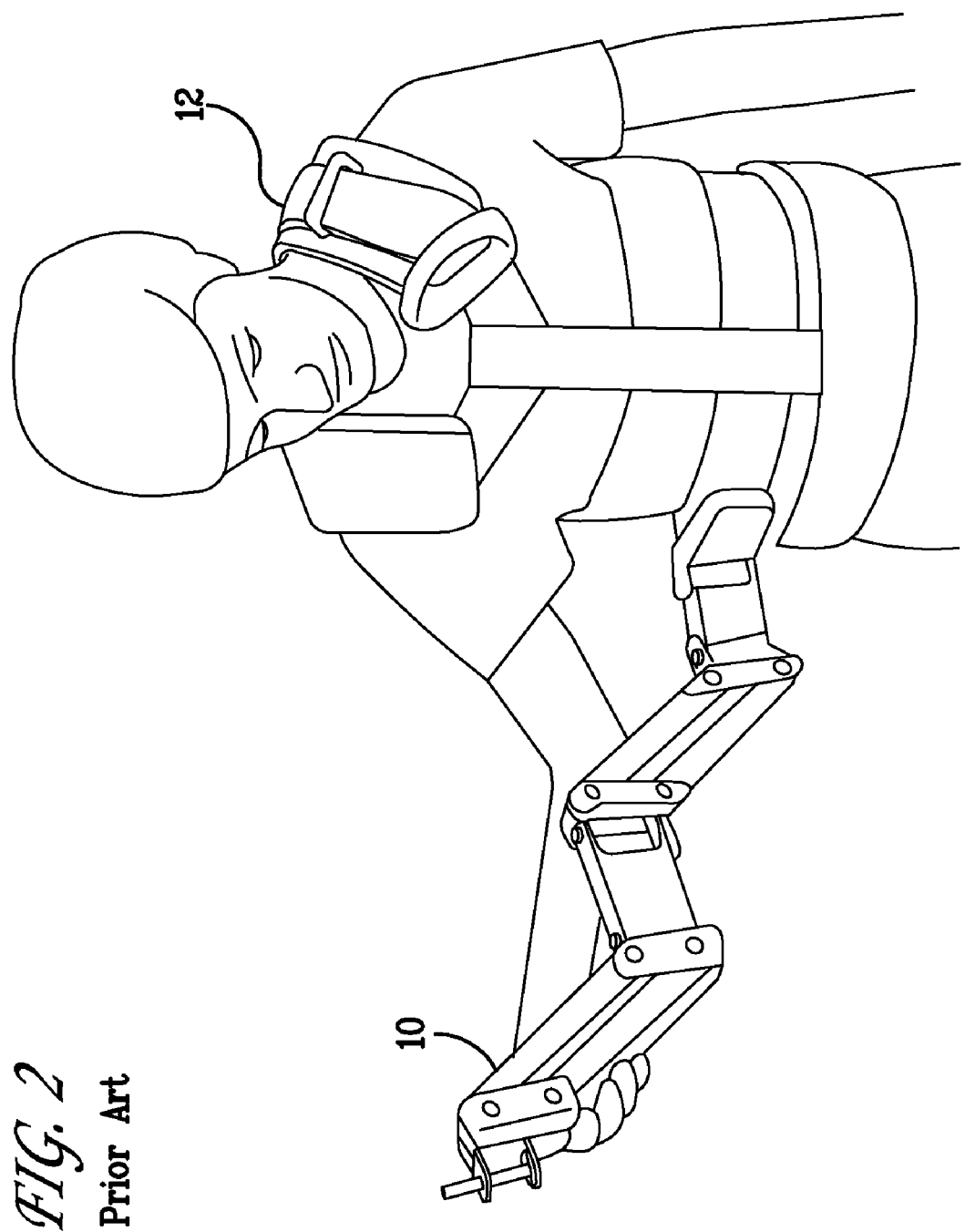
FIG. 2 is a side view of a prior art equipment support (the 'sled') with counterbalancing components.
Figure 3:
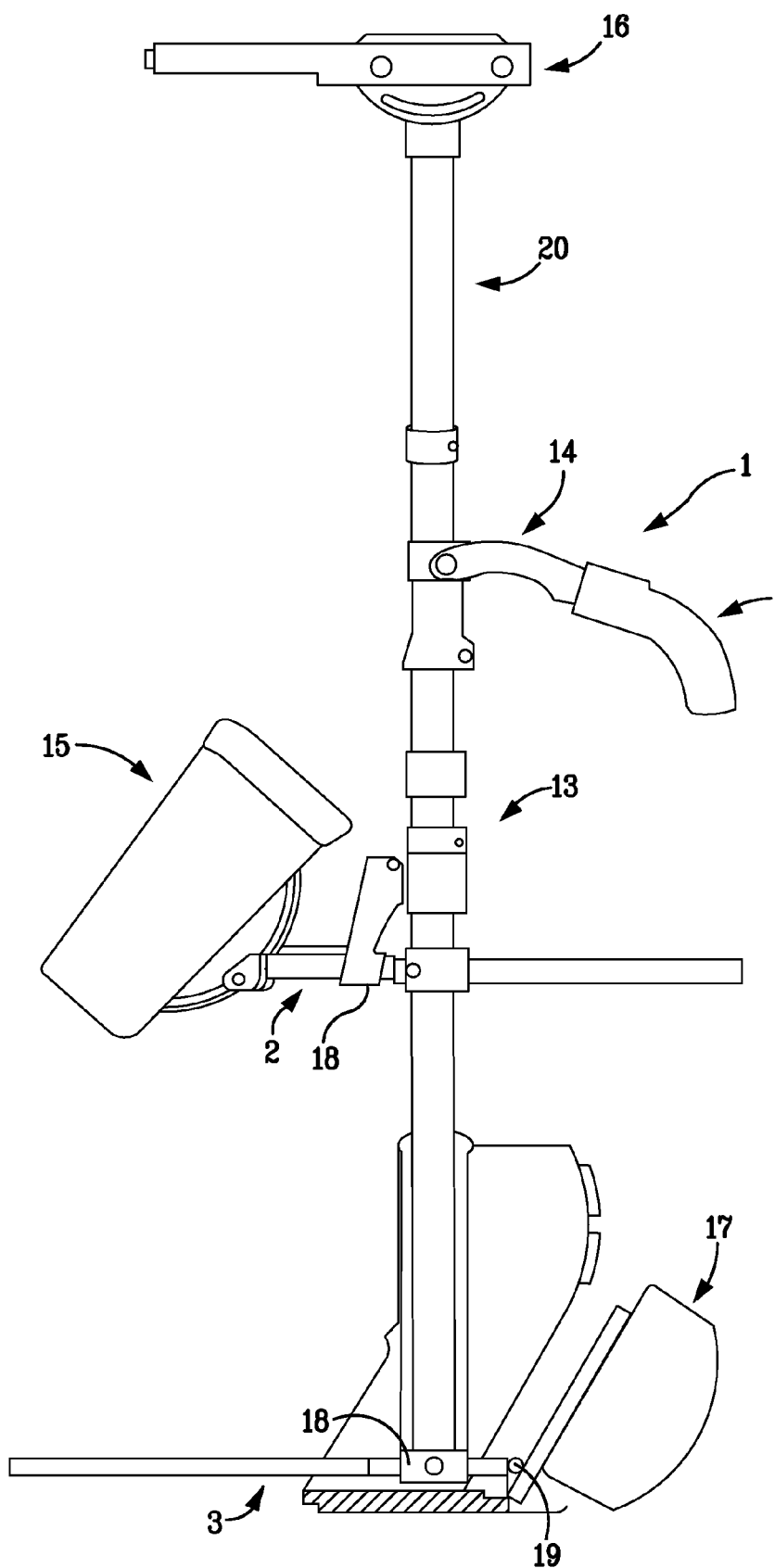
FIG. 3 is a side view of the sled of FIG. 2 with the components retracted.

FIG. 2 is a side view of a prior art support sled with its counterbalancing components, monitor 15 and batteries 17 extended away from central post 20 along support arms 1 and 2, respectively, to maximize or increase rotational inertia as compared to that resulting from the monitor and battery positions shown in FIG. 3.

FIG. 2 also shows a gimbal assembly 14 to maintain camera mounting stage 16 in a substantially horizontal position. Conventional non-folding support rod clamps 18 secure rods 1 in this extended position.

FIG. 3 depicts the sled of FIG. 1 with counterbalancing components, monitor 15 and battery 17, retracted to reduce or minimize rotational inertia as compared to that resulting from the monitor and battery positions shown in FIG. 1. Monitor 15 and battery 17 are retracted toward central post 20 along support rods 2 and 3, respectively. Rod clamps 18 secure support rods 2, 3 in the desired position with respect to central post 20. Battery clamp 19 can be loosened to swing battery 17 downward to further minimize inertia. Note that the apparatus still occupies a considerable volume of space due to the irreducible horizontal length of the support rods.

Figure 4:
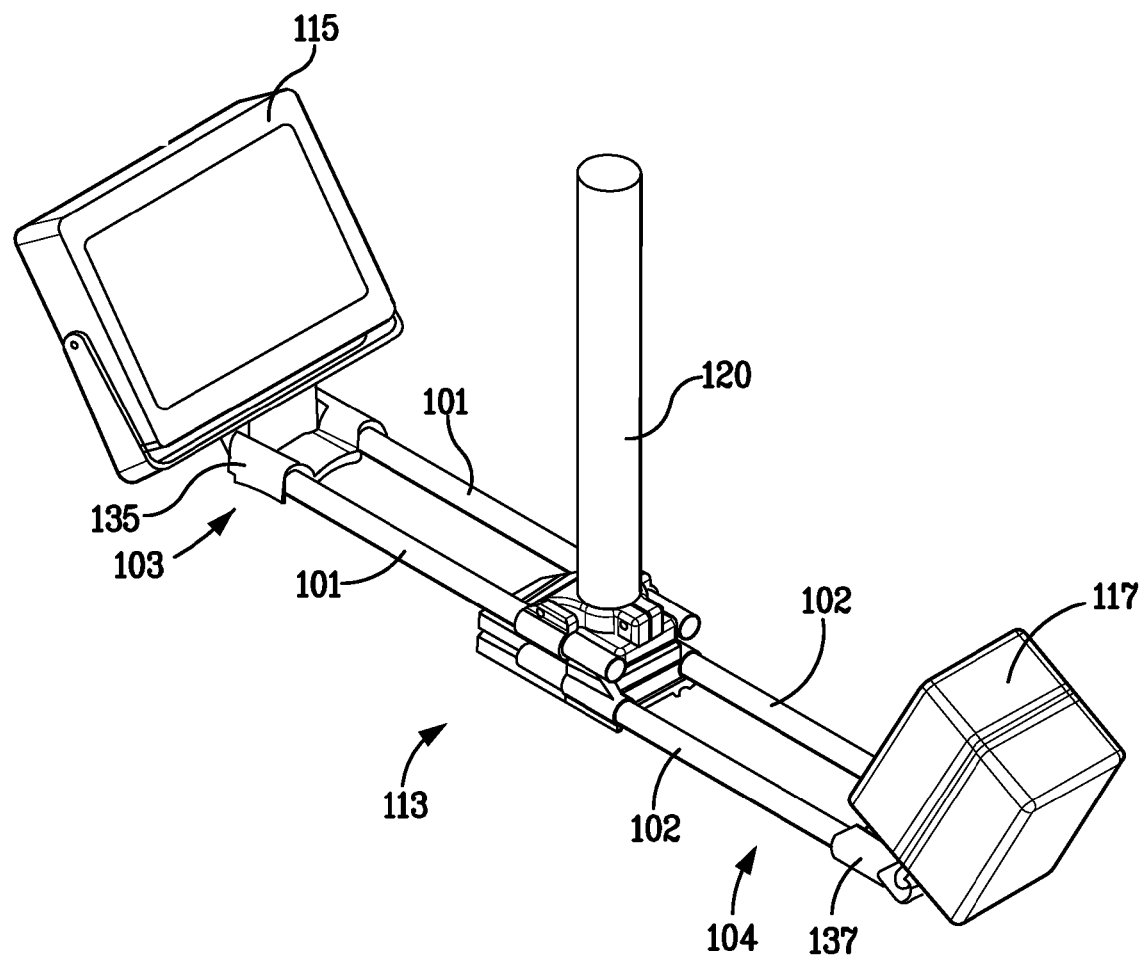
FIG. 4 is an isometric view of the base (lower) section of a sled with the support rods in an extended position according to an illustrative embodiment of the invention.

FIG. 4 is an isometric view of the base (lower) section of a sled 113 according to an illustrative embodiment of the invention. In this embodiment support rods 101 and 102 are clamped in a locked operative, extended position. Additional details of the clamping/locking mechanism with b described with respect to FIGS. 6-8. Monitor 115 and battery 117 extend away from central post 120. Battery clamp 137 secures battery 117 to support arms 102, and monitor clamp 135 secures monitor 115 to support arms 101.

Figure 5:
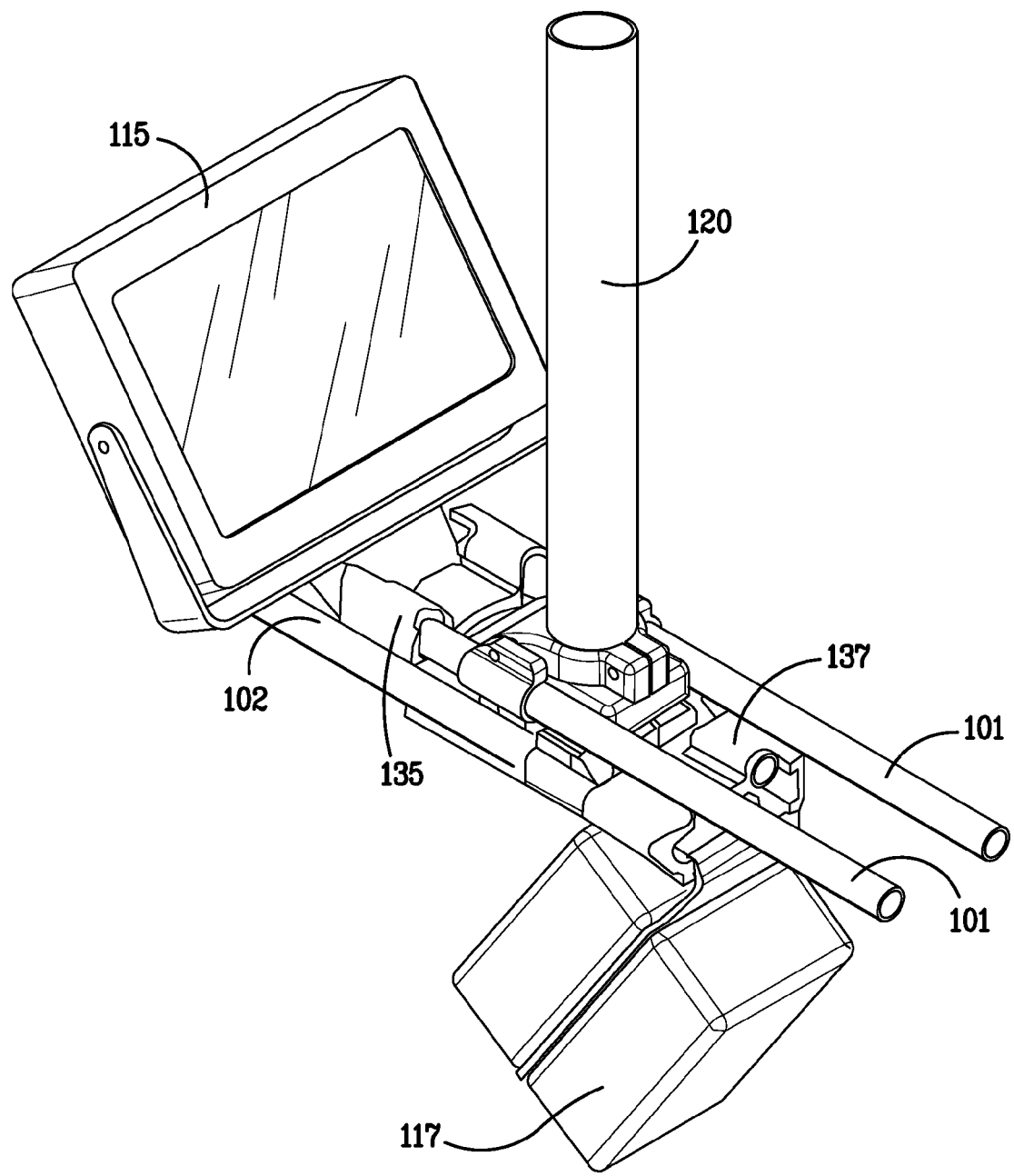
FIG. 5 an isometric view of the sled of FIG. 4, with the support rods in a retracted position according to an illustrative embodiment of the invention.

FIG. 5 is an isometric view of the sled base section of FIG. 4, but with support rods 101 and 102 their attached counterbalancing masses, monitor 115 and battery 117, clamped in an operative, but retracted position, by clamps 135 and 137, respectively, according to an illustrative embodiment of the invention. Monitor 115 and battery 117 are retracted toward central post 120, which would reduce inertia with respect to an extended configuration.

Battery clamp 137 is loosened to allow battery 117 to swing downward to further minimize the separation between monitor 115 and battery 117, and to improve dynamic balance in 'pan' (rotation around the axis of central post 120).

Figure 6:
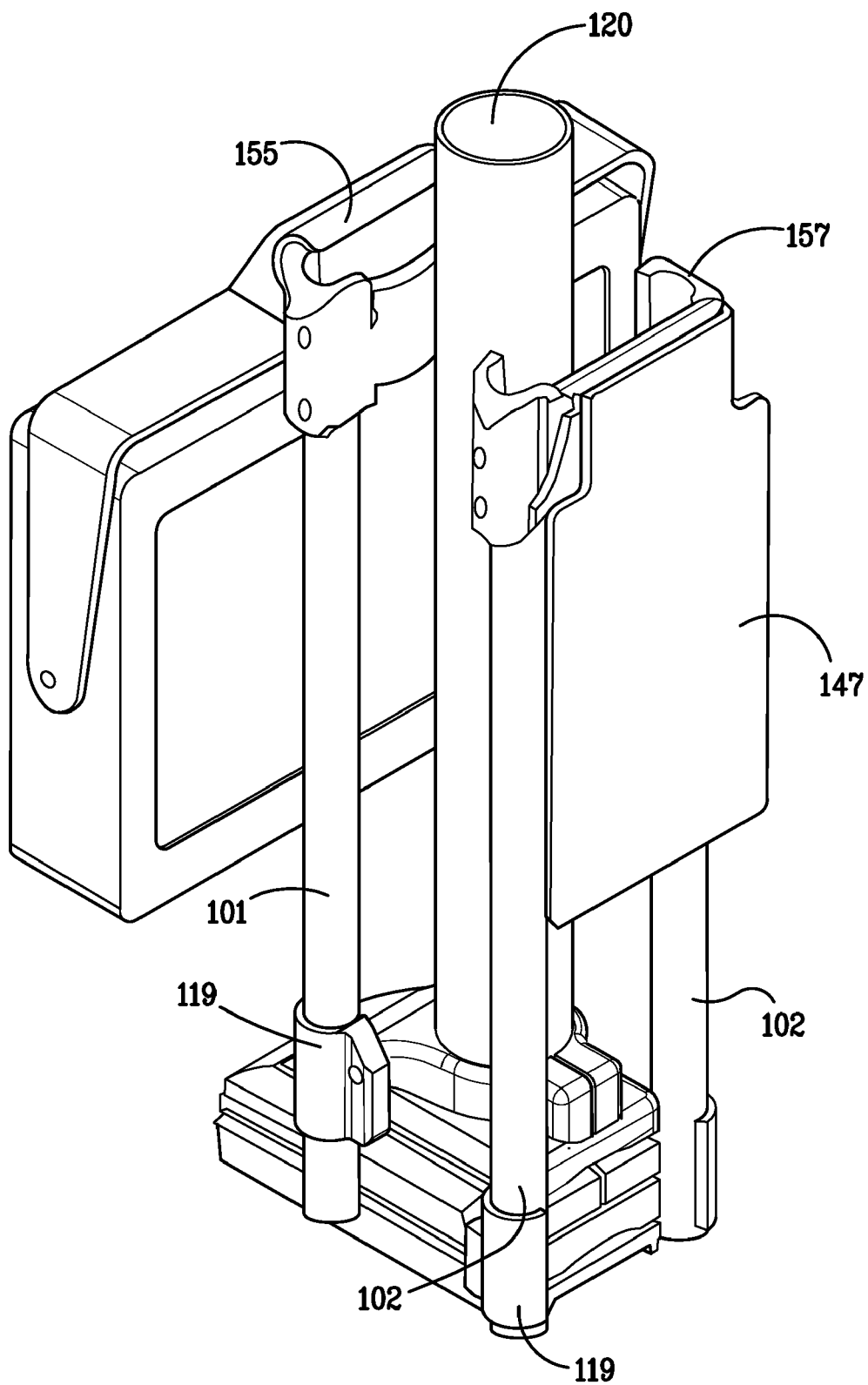
FIG. 6 is an isometric view of the sled of as FIGS. 4 and 5 in a 'storage' position according to an illustrative embodiment of the invention.

FIG. 6 is an isometric view of the sled base of FIGS. 4 and 5, but with support rod clamps 119 loosened to allow support rods 101 and 102 to fold toward central post 120 according to an illustrative embodiment of the invention. Clamps 119 are tightened to secure support rods 101 and 102 in the 'storage' position. (The batteries are not shown for clarity) The ability to remove the camera and fold the stabilizer equipment in order to reduce the space required for storage and transport is often desirable. These camera-removing and folding operations are preferably accomplished by hand, without the use of tools. Accordingly, attachment devices allowing for such operations are within the scope of the invention.

The batteries 117 would be positioned on battery mounting plate 147 or other mounting component. Battery mounting plate 147 is shown folded toward central post 120 and clamped in place by battery clamp 157. Monitor 115 is depicted folded toward central post 120 to a compact storage position, and secured in place by monitor clamp 155.

Figure 7:
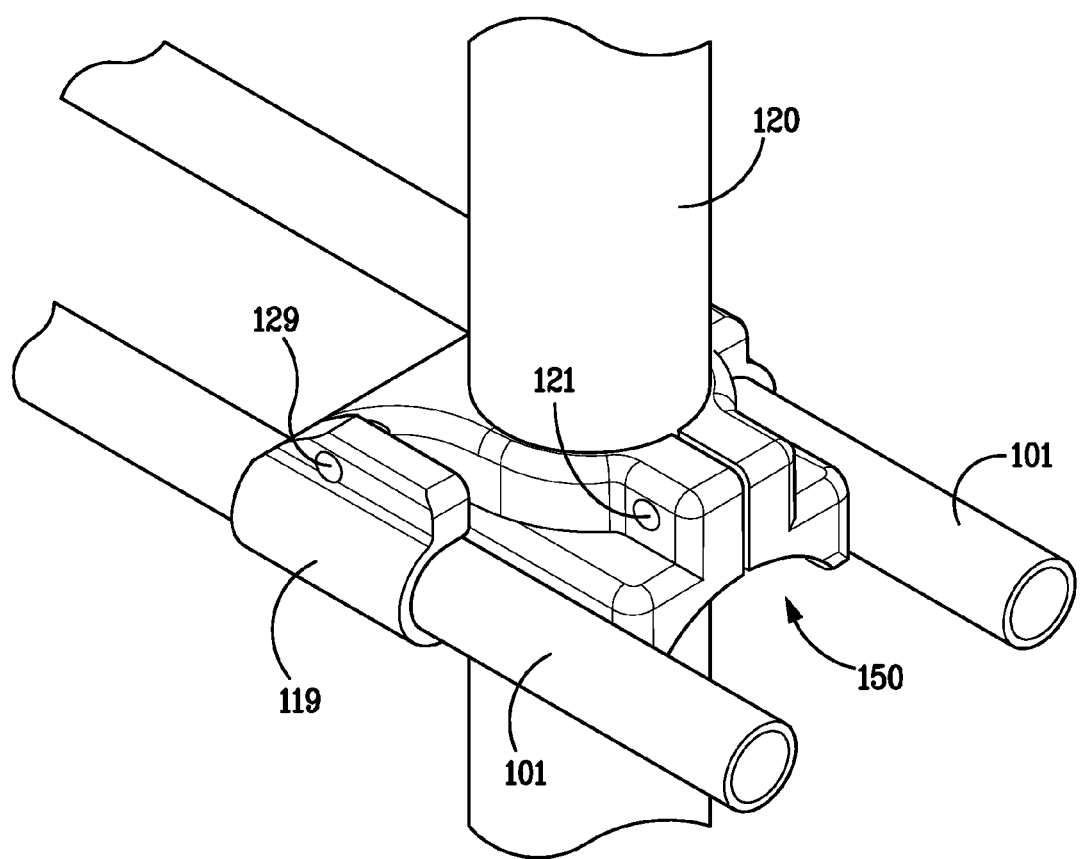
FIG. 7 is an isometric view of a support rod assembly, shown clamped in an operative' position with an external clamp, according to an illustrative embodiment of the invention.

FIG. 7 is an isometric view of a support rod assembly secured in an 'operative' position with an 'external' clamping mechanism according to an illustrative embodiment of the invention. Support rod holder 150 can be secured to central post 120 with a clamp screw inserted at clamp screw location 121. Support rods 101, are secured in an 'operative' position by one of the associated 'external' clamps 119, which includes a clamp screw inserted at clamp screw location 129. Support rod 101 is immobilized against support rod 'operative' orienting feature 122 (shown in FIG. 8), which is a mating concave groove complimentary to support rod 101. Support rods 101 need not be cylindrical, and thus orienting grooves 122 need not have a complimentary semi-cylindrical shape. Various other shapes and mechanisms to position support rods 101 in an 'operative' or 'storage' position can be used, provided they secure the support rods adequately in that position and allow the support rods to be re-positioned to a 'storage' position.

Figure 8:
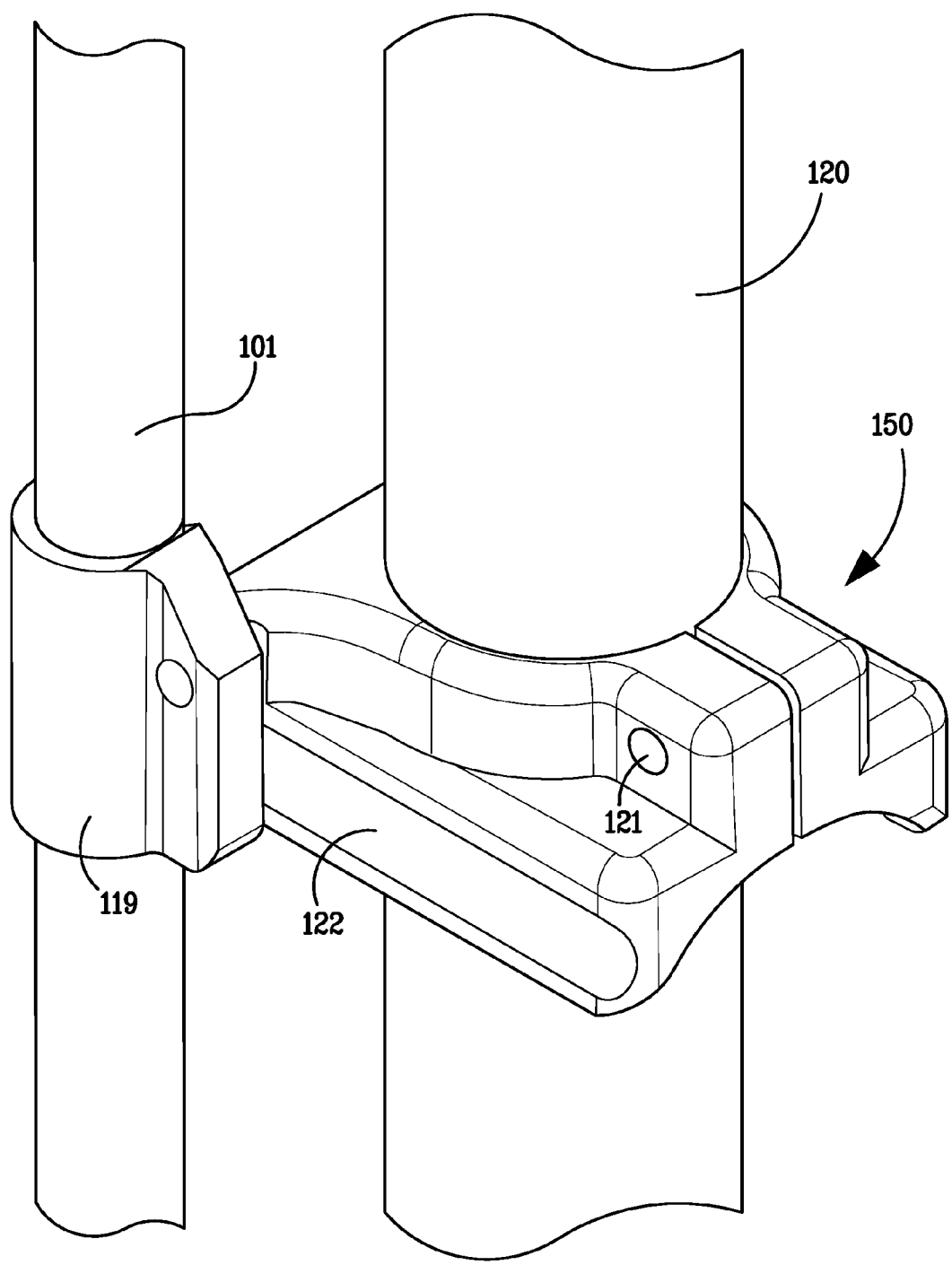
FIG. 8 is an isometric view of a support rod assembly in a storage position according to an illustrative embodiment of the invention.

FIG. 8 is an isometric view of a portion of a support rod assembly in a 'storage' position according to an illustrative embodiment of the invention. 'External' clamp 119 is rotated so support rod 101 is removed from complimentary groove 122. One or more other complimentary grooves can be incorporated into support rod holder 150 to position the support rods in desired positions with respect to central post 120. For example, a complimentary groove can be disposed substantially perpendicular to groove 122, to position support rod 101 in a position substantially parallel to central post 120, such as shown in FIG. 8. A clamp screw can be inserted at clamp screw location 121 to secure support rod 101 in a storage position. The clamp screw can include a knob to facilitate tightening the screw without tools. The components shown in FIGS. 7 and 8 can be used to support the monitor, batteries or other equipment, and therefore, can be duplicated a number of times along central post 120.

Figure 9:
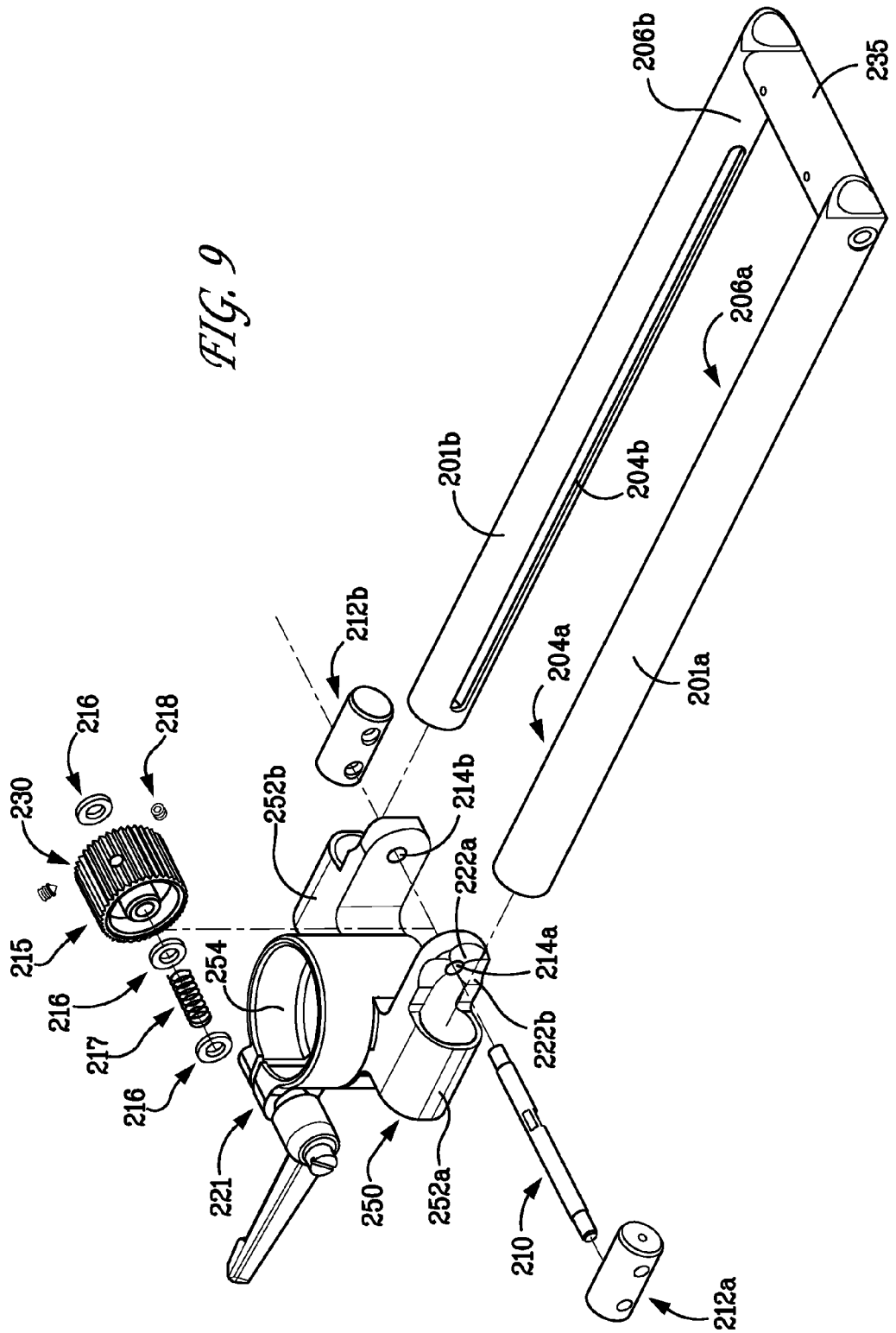
FIG. 9 is an exploded view of the components of an internally clamped support rod assembly according to an illustrative embodiment of the invention.
Figure 14:
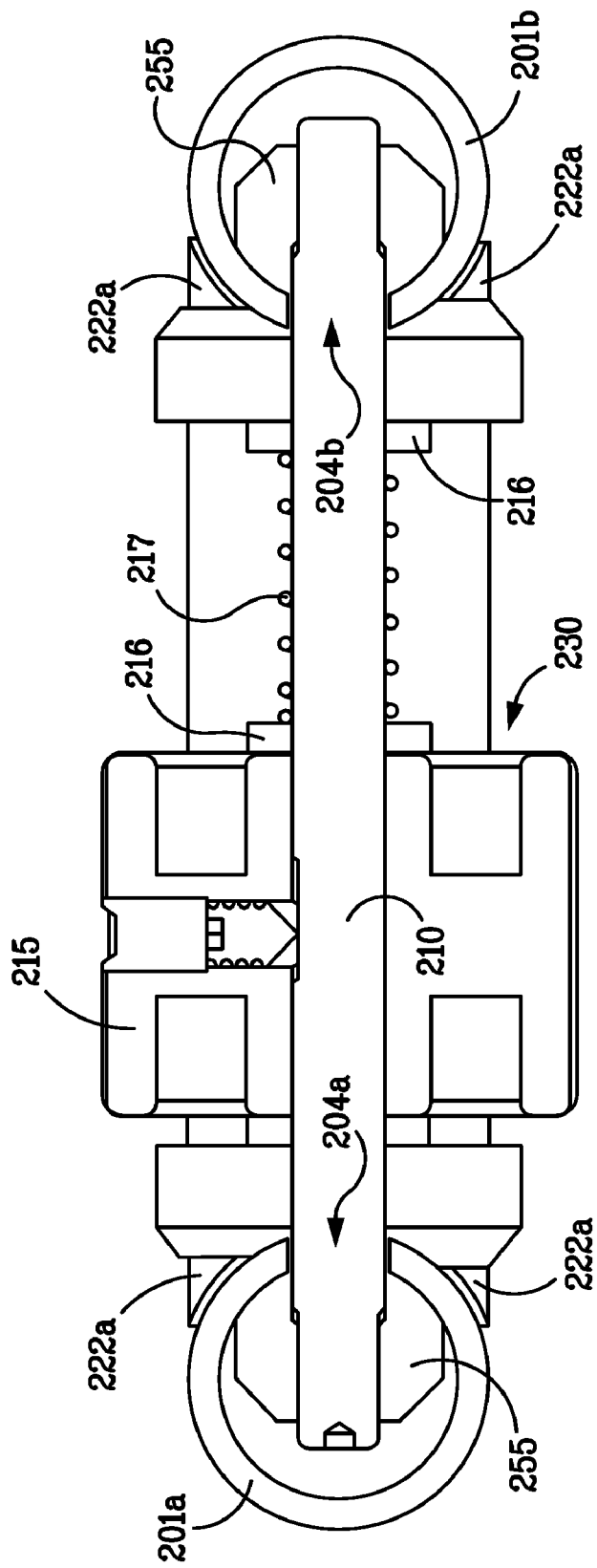
FIG. 14 is a cutaway end view of the internally clamped support rod assembly of FIG. 13 with the support rods clamped according to an illustrative embodiment of the invention.
Figure 15:
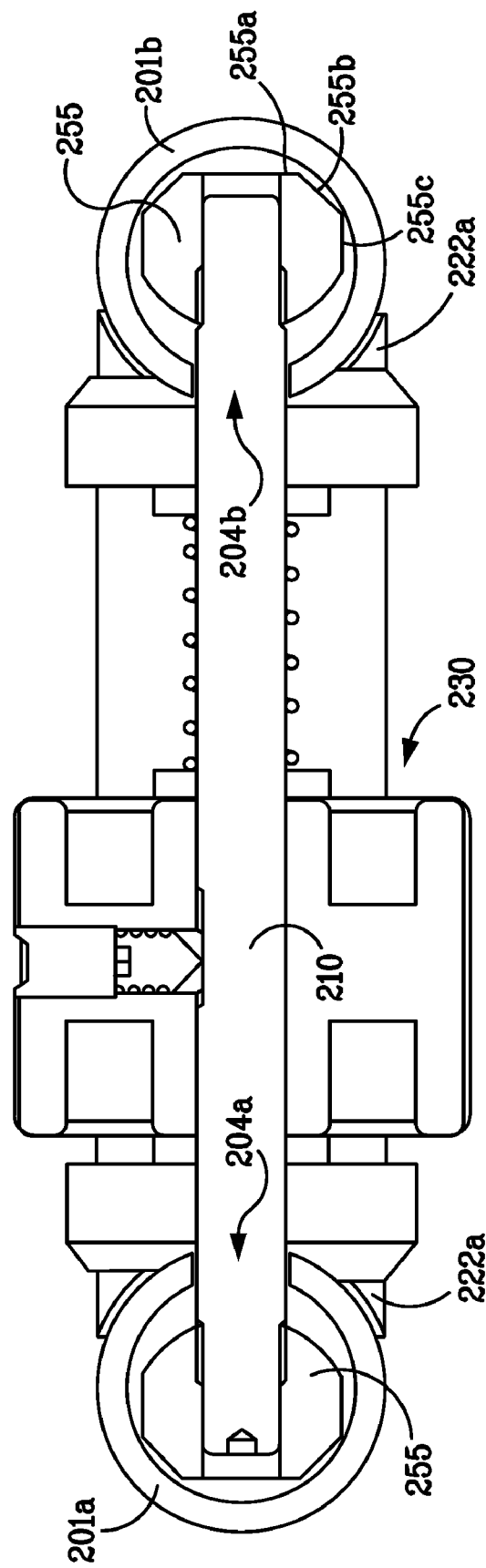
FIG. 15 is a cutaway end view of the internally clamped support rod assembly of FIG. 13 with the support rods unclamped according to an illustrative embodiment of the invention.

FIG. 9 is an exploded view of the components of an 'internally' clamped support rod assembly according to an illustrative embodiment of the invention. The assembly includes a support rod holder 250 with support rod receiving components 252a, 252b, in this embodiment which are cylindrical components into which support rods 201a and 201b can be slid, there being close tolerances therebetween to minimize movement between the parts. Support rods 201a, 201b have slits 204a, 204b (the former not being visible in FIG. 9) disposed longitudinally along inner surfaces 206a, 206b of the rod. Support rods 201a, 201b are connected by a monitor clamp component 235, which also secures a monitor to the support assembly. Support rod holder 250 also accommodates and supports a central post at opening 254, using for example, central post clamp 221. A turnbuckle assembly 230 includes shaft 210 disposed through clamp nuts 212a, 212b and through holes 214a, 214b in support rod holder 250. Turnbuckle shaft 210 engages slots 204a, 204b as shown in FIGS. 14 and 15. Turnbuckle knob 215 is held by set screw 218 onto turnbuckle shaft 210. One or more spacers 216 are provided in line with compression spring 217. Turnbuckle 215 can thus be rotated to move support rods 201a, 201b with respect to rod receiving components 252a, 252b, thereby drawing a monitor or other component secured at 'monitor' clamp component 235 toward and away from a central post disposed within opening 254. Orienting features or complimentary grooves 222a, 222b are provided to position support rods 201a, 201b in either an operative position or a storage position. Additional complimentary grooves or other positioning features can be used to stabilize the support rods in desired positions. In the embodiment shown in FIG. 9, complimentary grooves 222a, 222b intersect at a perpendicular angle to one another.

Figure 10:
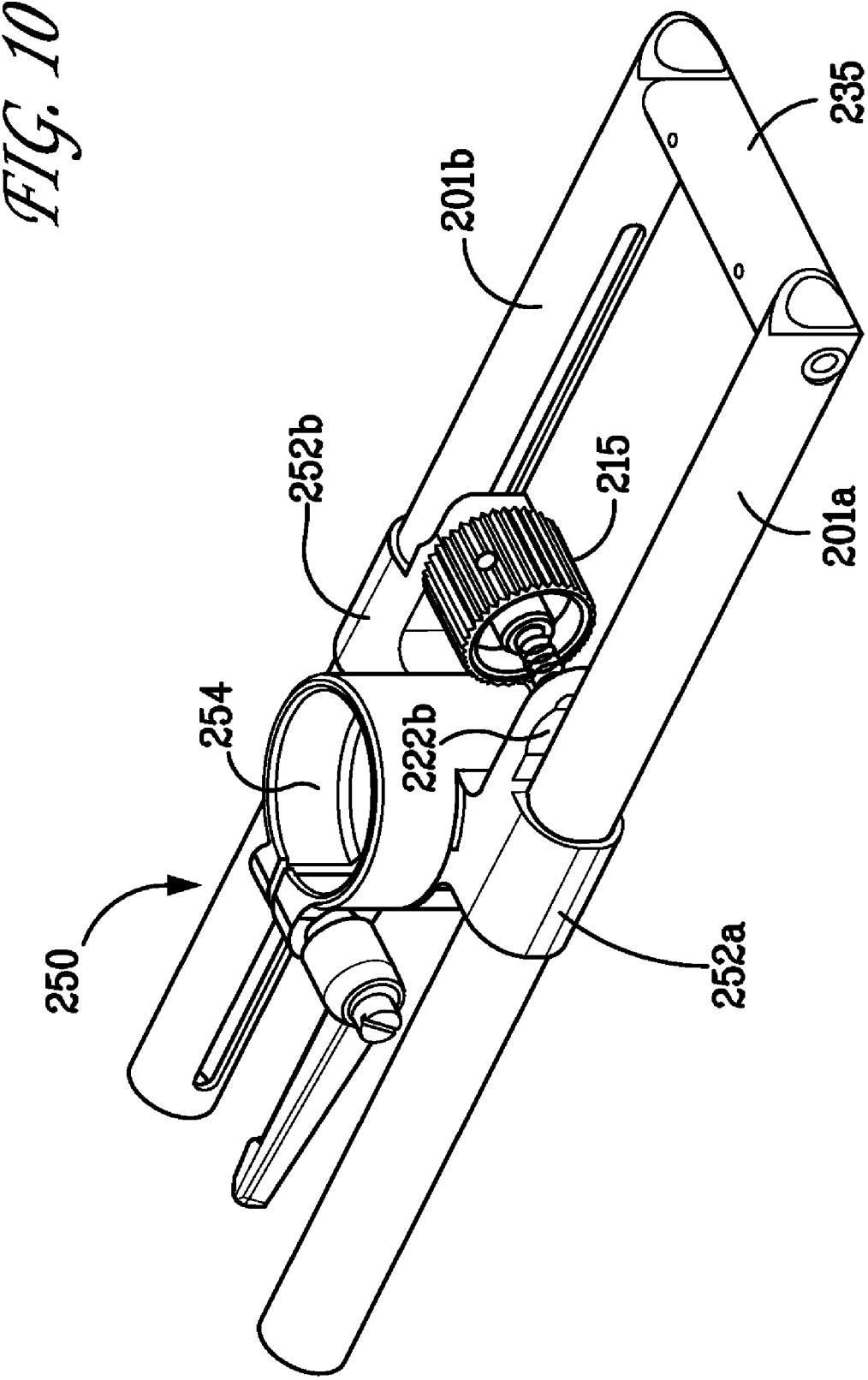
FIG. 10 is an isometric view of an internally clamped support rod assembly in an operative position according to an illustrative embodiment of the invention.

FIG. 10 is an isometric view of an 'internally' clamped support rod assembly in an operative position according to an illustrative embodiment of the invention. Support rods 201a, 201b are positioned in orienting features 222a, which locates them in an operative position. Because support rods 201a, 201b are positioned in the complimentary-shaped orienting feature 222a, that feature is not visible. Instead, the storage position orienting feature, 222b, is visible. Support rods 201a, 201b are disposed within receiving components 252a, 252b and thus can be drawn through receiving components 252a, 252b using turnbuckle 215 to position a monitor or other component secured to the rods toward or away from a central post, such as would be positioned in opening 254 in support rod holder 250.

Figure 11:
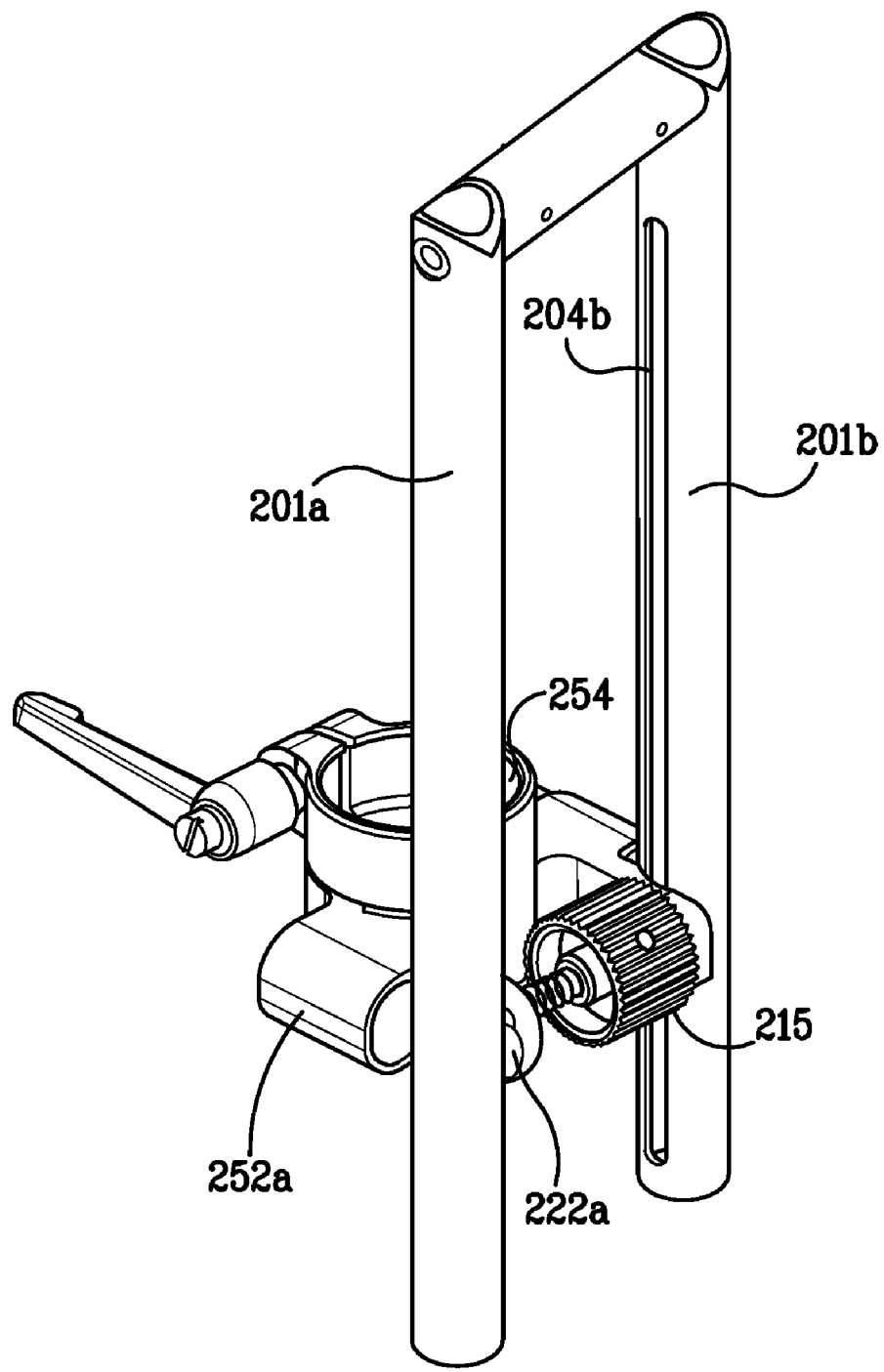
FIG. 11 is an isometric view of an internally clamped support rod assembly in a folded position according to an illustrative embodiment of the invention.

FIG. 11 is an isometric view of an internally clamped support rod assembly in the folded or storage position according to an illustrative embodiment of the invention. Support rods 201a, 201b are slid out of receiving components 252a, 252b, by rotating turnbuckle 215, until they are position to rotate into orienting features 222a, which locate the support rods 201a, 201b in a storage position, such as substantially parallel to a central post that would be disposed within opening 254. In this particular embodiment, turnbuckle shaft 210 can be disposed at various locations along slits 204a, 204b in support arms 201a, 201b, respectively.

It is noted that some of the components or features in the assemblies have been described as being in pairs, however, two of each item is not always necessary. For example, the complimentary grooves or orienting features need not be on either side of a support rod holder to position the support rods in their desired operative or storage position.

Figure 12:
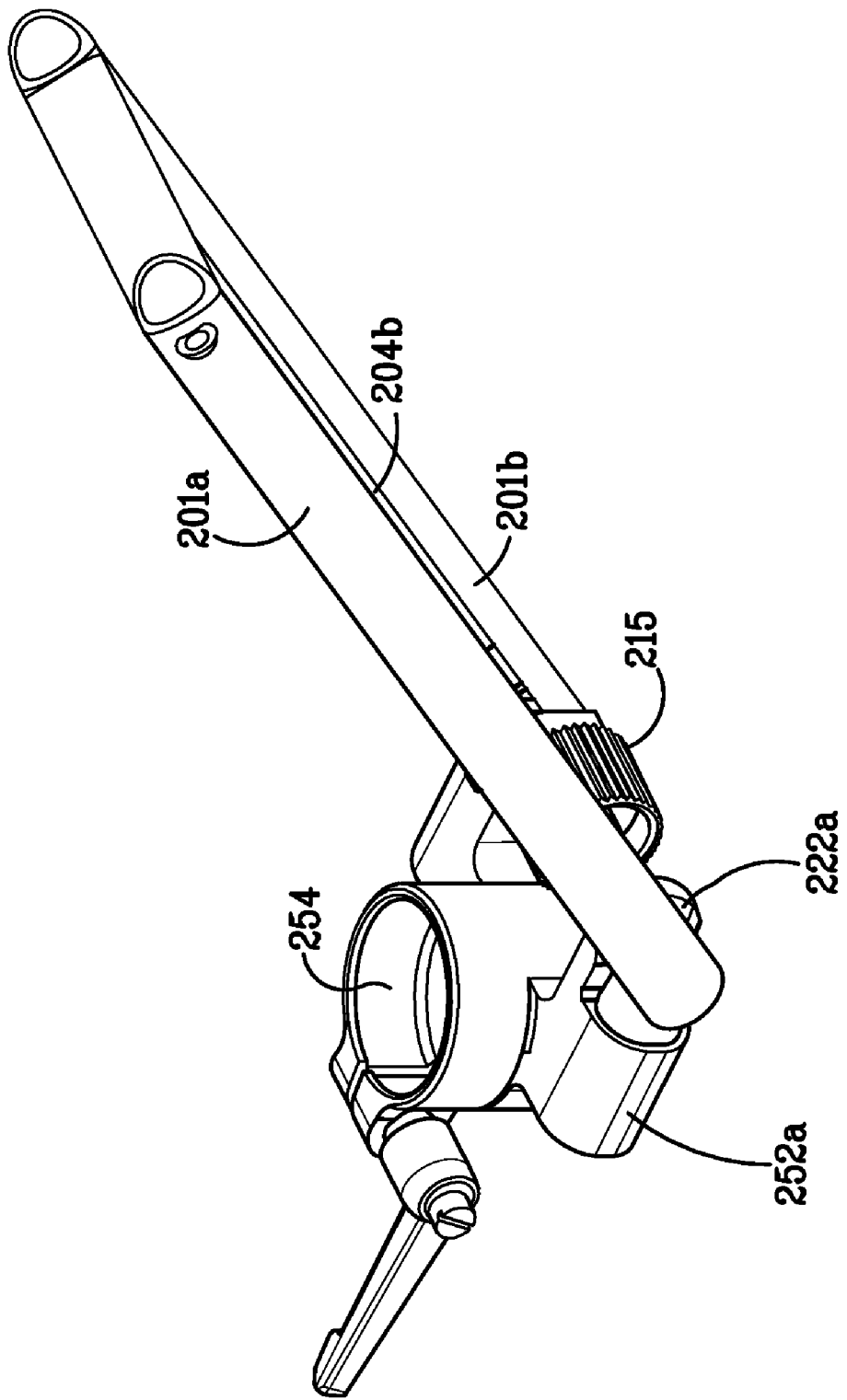
FIG. 12 is an isometric view of the internally clamped support rod assembly of FIG. 11 in an unclamped position transitioning between the operative position and the folded storage position according to an illustrative embodiment of the invention.

FIG. 12 is an isometric view of an internally clamped support rod assembly in an unclamped position transitioning between an operative position and a folded storage position according to an illustrative embodiment of the invention. Turnbuckle knob 215 has been turned to release internal clamp nuts 212a, 212b (shown in FIG. 9) and allow turnbuckle shaft 210 to be released from support rod slits 204a, 204b (shown in FIG. 9), thus permitting support rods 201a, 201b to be drawn out of support rod receiving components 252a, 252b (252b shown in FIG. 9). Support rods 201a, 201b are shown in transition between operative orienting feature 222a on the way to engaging orienting feature 222b (shown in FIG. 9) to effectuate a storage position.

Figure 13:
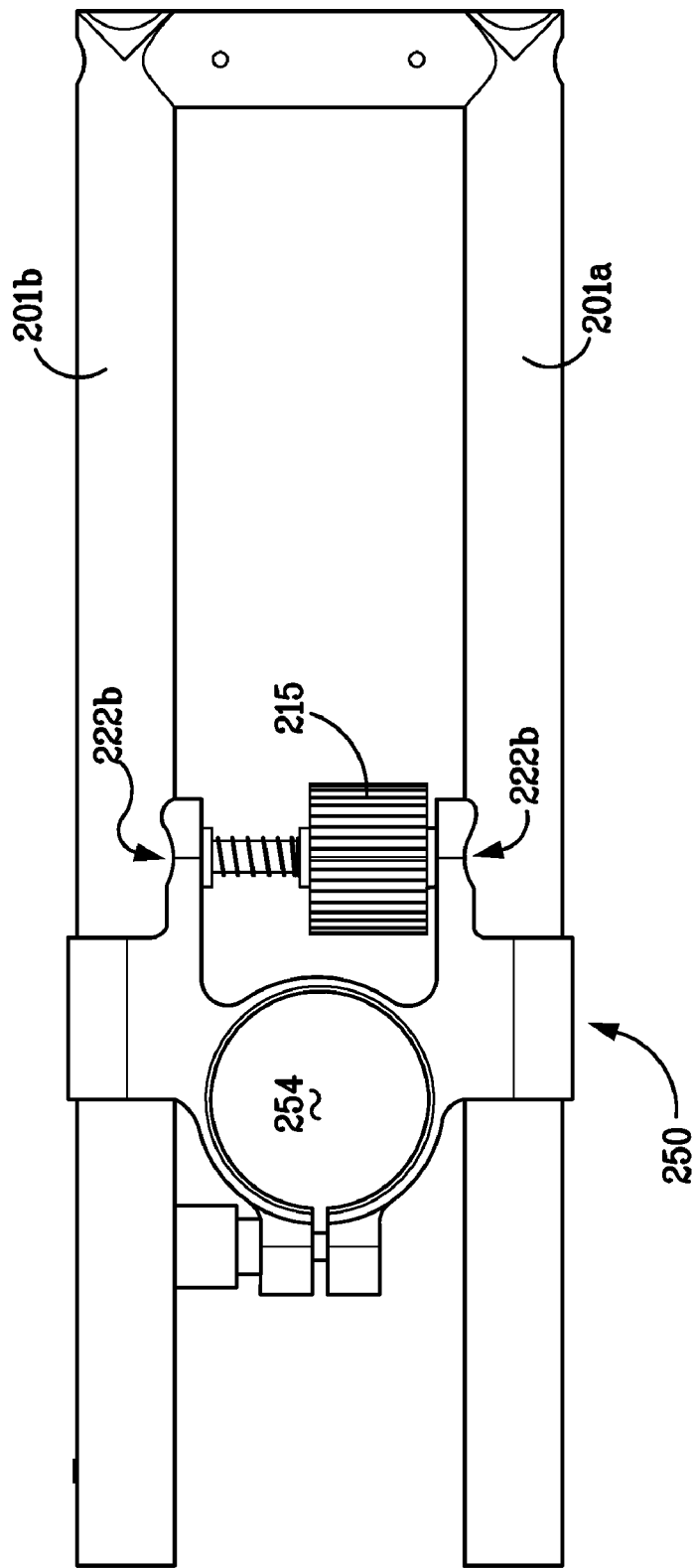
FIG. 13 is a top view of the internally clamped support rod assembly of FIG. 11 clamped in an operative position according to an illustrative embodiment of the invention.

FIG. 13 is a top view of a support rod assembly according to an illustrative embodiment of the invention. Support rods 201a, 201b are in an operative position. Orienting features 222b are shown as arced indentations, which would engage support rods 201a, 201b in a storage position. Orienting features 222a, which would position rods 201a, 201b in an operative orientation are not visible because the support rods are seated in them. The groove profile shown is suitable for cylindrical rods. Other cross-sectional profiles or rods and grooves are within the scope of the invention. The orienting feature cross-sectional profile is preferably complimentary to the rod cross-sectional profile.

Support rods 201a, 201b can be released from the operative position using turnbuckle knob 215 to allow them to pivot to a position substantially parallel to a central post that would be disposed within opening 254.

FIG. 14 is a cutaway end view of the turnbuckle assembly of an illustrative embodiment of the invention with internal clamp nuts 255 drawn inward by the turnbuckle assembly 230, clamping support rods 201a, 201b against orienting feature 222a. This places the apparatus in an operating configuration, because orienting features 222a are substantially perpendicular to the central post opening 254 (see FIG. 9). Turnbuckle knob 215 is clamped to turnbuckle shaft 210 by setscrew 218. Spring 217 and spacers 216 maintain the position of turnbuckle shaft 210 and internal nuts 255 when loosened and unclamped (see FIG. 15).

FIG. 15 is a cutaway end view of the internally clamped support rod assembly of FIG. 13 according to an illustrative embodiment of the invention. FIG. 15 shows turnbuckle assembly 230, which is utilized to transition clamp nuts 255 between a 'released' and 'secured' configuration. FIG. 15 depicts clamp nuts 255 in a 'released' configuration. Turnbuckle shaft 210 is positioned such that support rods 201a, 201b are unclamped from operative orienting features 222a. Clamp nuts 255 are dimensioned so when released, i.e. drawn inward toward one another, they either no longer contact, or have minimal contact with, the inner diameter of support rods 201a, 201b, allowing support rods 201a, 201b to swing between orienting features 222a and 222b.

In the illustrative embodiment shown in FIGS. 14 and 15, clamp nuts 255 each have three pairs of beveled faces 255a, 255b, 255c. The unbeveled side of clamps 255 have the same or similar radius of curvature as the inner diameter of support arms 201a, 201b so they fit snuggly when the support arms are in an oriented position, such as a folded or storage position. The beveling reduces the diameter of clamp nuts 255 so when released, i.e. drawn away from one another, they have no or minimal contact with the inner diameter of support rods 201a, 201b. Thus, the bevels provide a 'dead band' between the clamped and released positions of the internal clamp nuts 255 sufficient to facilitate folding operations. Other clamp nut shapes or mechanisms that provide these functions are within the spirit of the invention. Note also that only one clamp nut may be necessary, in which case the released position, i.e. when the support component can transition between folded and operative orientations, can be described as when the clamp nut is moved radially away from the perpendicular center line of the turnbuckle shaft, and the locked position is when the clamp nut is moved radially toward the perpendicular center line of the turnbuckle shaft. Note though that this can be reversed by configuring the diameter of the clamp nut accordingly.

Embodiments of the invention will now be described further in a general manner. In a broad embodiment, the invention is a folding, adjustable camera support having a central post, such as part 120 in FIG. 7, secured in one or more central post holders, such as part 150 in FIG. 7. The camera support further includes a first support component to support camera equipment such as a monitor or batteries (see for example FIG. 4, reference number 103). Similarly, a second support component is included to support camera equipment such as a monitor or batteries (see for example FIG. 4, reference number 104). The first and second support components are disposed extending from the central post on opposite sides of the central post, thus positioned to be used to balance the camera support apparatus. Examples of the first and second support components and their position relative to the central post in both an operative and folded position are depicted in FIGS. 4 and 6, respectively, and FIGS. 7 and 8, respectively. Each of the first and second support components have a distal and proximate end, the proximate end being attached to one of the one or more central post holders. The first and second support components are configured to adjust between an operative position and a folded position via an adjustment mechanism, examples of which will be described further below. Camera equipment such as a monitor and batteries are attached at the distal ends of the first and second support components, for example as shown in FIG. 4 wherein a monitor is attached at the distal end of support component 103 and battery 117 is attached at the distal end of support component 104. The position of the camera equipment is adjustable radially from the central post, for example between the positions shown in FIGS. 4 and 5. In an illustrative embodiment of the invention the mechanism to adjust the camera support between a folded and operative orientation includes one or more first support rod operative orienting features such as 222*a*, 222*b* for example, having cross-sectional profiles complimentary to the cross-sectional profiles of first and second support rods such as parts 101, 102. One or more operative orienting features, such as 222*a*, are disposed to accommodate the first support rod(s) in an operative position. Similarly, one or more first support rod folded orienting features, such as 222*b*, having cross-sectional profiles complimentary to the cross-sectional profiles of the first support rods such as 101, 102 are disposed to accommodate the first support rod(s) in a folded position. Various other mechanisms can be used to lock the camera support apparatus into folded or operative positions, provided they secure the first and second support components in the desired positions. Preferably the mechanisms do not require tools to transition the camera support between folded and operative orientations. In general, mechanisms to bias the first and second support components to folded or operative positions are within the scope of the invention.

As the intent is to decrease the size of the camera support for storage, including when monitors and batteries are attached, an illustrative embodiment of the invention provides a mechanism to swing the monitor and/or the batteries toward the center post. An example of this feature can be seen by comparing the position of battery 117 in FIGS. 4 and 5. As can be seen by comparing the figures, the width of the camera support containing the first camera equipment (a battery in this case) is reduced.

The adjustment mechanism has been described by two embodiments, one where the support rods can be rotated between complimentary operative and folded orienting features positioned "external" to the components through which the central post is disposed (FIGS. 4-8) and an adjustment mechanism that includes a turnbuckle mechanism, such as shown in FIGS. 9-15. It will be understood by those skilled in the art that other adjustment mechanisms that allow the first and second support components to be oriented between folded and operative positions can be incorporated into embodiments of the invention.

With respect to the turnbuckle assembly, it is also noted that the turnbuckle can act on components other than internal clamp nuts to engage and disengage the support rods to allow their transition between folded and operative positions.

As to use of clamp nuts, the clamp nut has a varied diameter such that when the clamp nut is moved radially toward the perpendicular center line of the turnbuckle shaft, the support component is locked into a folder or operative orientation, and when the clamp nut is moved radially away from the perpendicular center line of the turnbuckle shaft, the support component is unlocked and can transition between folded and operative orientations.

The camera support can also contain a mounting stage on which to secure a camera. An example of such a mounting stage is shown in prior art FIGS. 1 and 3 by part 16. A gimbal assembly may also be included, and preferably attached to the central post. An example of a gimbal assembly is shown in FIGS. 1 and 3 as part 14. The assembly can include a handle such as part 5. The central post can be telescoping, and the central post holders can be adjustable circularly around the central post and longitudinally along it.

The invention also includes a method of supporting and balancing a camera. In an illustrative embodiment of the invention, the method includes providing a support system according to any of the embodiments described herein or their equivalents, attaching a camera to the mounting stage, attaching camera equipment other than the camera to the first and second camera equipment attachment devices, radially adjusting the position of the first and second camera equipment with respect to the central post to balance the support apparatus when held at the handle of the gimbal apparatus. The method further can comprise adjusting the camera support system between an operative configuration and a folded configuration via the adjustment mechanism.

Various embodiments of the invention have been described, each having a different combination of elements. The invention is not limited to the specific embodiments disclosed, and may include different combinations of the elements disclosed and their equivalents.

While the invention has been described by illustrative embodiments, additional advantages and modifications will occur to those skilled in the art. Therefore, the invention in its broader aspects is not limited to specific details shown and described herein. Modifications may be made without departing from the spirit and scope of the invention. Accordingly, it is intended that the invention not be limited to the specific illustrative embodiments, but be interpreted within the full spirit and scope of the embodiments described herein and their equivalents, and the appended claims and their equivalents.

The invention claimed is:

1. A folding, adjustable camera support comprising:
a central post secured in one or more central post holders;
a first support component having a distal end and a proximate end;
the first support component adjustably attached at its proximate end to one of the one or more central post holders, configured to adjust between an operative position and a folded position via an adjustment mechanism;
a first camera equipment attachment device attached to the first support component at the first support component distal end, wherein the distance of the first camera equipment attachment device is adjustable radially from the central post;
a second support component having a distal end and a proximate end;
the second support component adjustably attached at its proximate end to one of the one or more central post holders, and configured to adjust between an operative position and a folded position via an adjustment mechanism independently of adjustment of the first support component;
a second camera equipment attachment device attached to the second support component at the second support component distal end, wherein the distance of the second camera equipment attachment device is adjustable radially from the central post.

2. The folding, adjustable camera support of claim 1 wherein the first support component comprises one or more first support rods adjustably attached to the central post between an operative position and a folded position via an adjustment mechanism comprising:
one or more first support rod discrete operative orienting features having cross-sectional profiles complimentary to the cross-sectional profiles of the first support rods and disposed to accommodate the first support rod(s) in an operative position; and
one or more first support rod discrete folded orienting features having cross-sectional profiles complimentary to the cross-sectional profiles of the first support rods and disposed to accommodate the first support rod(s) in a folded position.

3. The folding, adjustable camera support of claim 2 wherein the second support component comprises one or more second support rods adjustably attached to the central post between an operative position and a folded position via an adjustment mechanism comprising:
one or more second support rod discrete operative orienting features having cross-sectional profiles complimentary to the cross-sectional profiles of the second support rods and disposed to accommodate the second support rod(s) in an operative position; and
one or more second support rod discrete folded orienting features having cross-sectional profiles complimentary to the cross-sectional profiles of the second support rods and disposed to accommodate the second support rod(s) in a folded position.

4. The folding, adjustable camera support of claim 1 wherein the first camera equipment attachment device is configured to allow attached equipment to pivot toward the central post, thereby reducing the width of the camera support containing the first camera equipment.

5. The folding, adjustable camera support of claim 1 wherein the second camera equipment attachment device is configured to allow attached equipment to pivot toward the central post, thereby reducing the width of the camera support containing the second camera equipment.

6. The folding, adjustable camera support of claim 1 wherein the support component adjustment mechanism has a turnbuckle mechanism comprising:
a turnbuckle assembly having:
a turnbuckle shaft disposed through at least one internal clamp nut insertable into a support component, the internal clamp nut having a varied outer diameter such that when the clamp nut is moved radially toward the perpendicular center line of the turnbuckle shaft, the support component is locked into a discrete folded or discrete operative orientation, and when the clamp nut is moved radially away from the perpendicular center line of the turnbuckle shaft, the support component is unlocked and can transition between folded and operative orientations.

7. The folding, adjustable camera support of claim 6 wherein the internal clamp nut has a plurality of bevels to vary the internal clamp nut outer diameter.

8. The folding, adjustable camera support of claim 1 further comprising:
a mounting stage on which to secure a camera; and
a gimbal assembly attached to the central post below the camera mounting stage, the gimbal apparatus having a handle.

9. A method of supporting a camera comprising:
providing a support system according to claim 8;
attaching a camera to the mounting stage;
attaching camera equipment other than the camera to the first camera equipment attachment device;
attaching camera equipment other than the camera to the second camera equipment attachment device;
radially adjusting the position of the first and second camera equipment with respect to the central post to balance the support apparatus when held at the handle of the gimbal apparatus.

10. The method of claim 9 further comprising:
adjusting the camera support system between an operative configuration and a folded configuration via the adjustment mechanism.

11. A folding, adjustable camera support comprising:
a central post secured in one or more central post holders;
a first support component having a distal end and a proximate end;
the first support component adjustably attached at its proximate end to one of the one or more central post holders, configured to adjust between an operative position and a folded position via an adjustment mechanism;
a first camera equipment attachment device attached to the first support component at the first support component distal end, wherein the distance of the first camera equipment attachment device is adjustable radially from the central post;
a second support component having a distal end and a proximate end;
the second support component adjustably attached at its proximate end to one of the one or more central post holders, and configured to adjust between an operative position and a folded position via an adjustment mechanism independently of adjustment of the first support component; and
a second camera equipment attachment device attached to the second support component at the second support component distal end, wherein the distance of the second camera equipment attachment device is adjustable radially from the central post;
wherein the support component adjustment mechanism has a turnbuckle mechanism comprising:

a turnbuckle assembly having:
 a turnbuckle shaft disposed through at least one internal clamp nut insertable into a support component, the internal clamp nut having a varied outer diameter such that when the clamp nut is moved radially toward the perpendicular center line of the turnbuckle shaft, the support component is locked into a discrete folded or discrete operative orientation, and when the clamp nut is moved radially away from the perpendicular center line of the turnbuckle shaft, the support component is unlocked and can transition between folded and operative orientations.

12. The folding, adjustable camera support of claim 11 wherein the internal clamp nut has a plurality of bevels to vary the internal clamp nut outer diameter.

* * * * *